Figure 1:
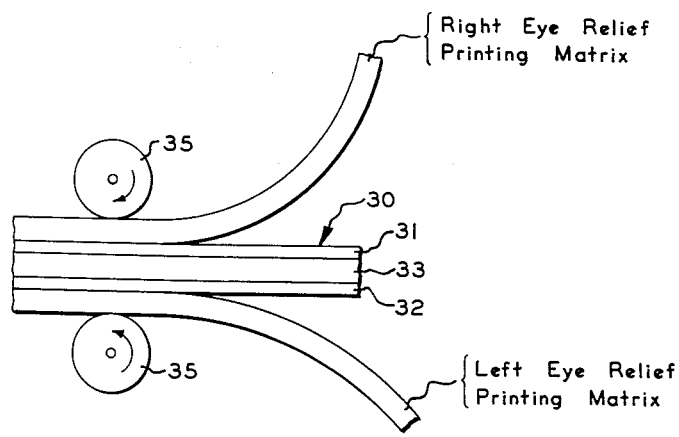

April 5, 1960 W. H. RYAN ET AL 2,931,295
PROCESSING OF MOLECULARLY ORIENTED SHEETS OF TRANSPARENT, LINEAR,
HIGH MOLECULAR WEIGHT, HYDROXYL-CONTAINING POLYMERS
TO IMPROVE THE DYEING QUALITIES THEREOF
Filed May 21, 1954

INVENTORS
William H. Ryan
and
Vivian K. Walworth

BY Broward Mikulka
and
Moncure B. Berg
ATTORNEYS

United States Patent Office 2,931,295
Patented Apr. 5, 1960

2,931,295
PROCESSING OF MOLECULARLY ORIENTED SHEETS OF TRANSPARENT, LINEAR, HIGH MOLECULAR WEIGHT, HYDROXYL - CONTAINING POLYMERS TO IMPROVE THE DYEING QUALITIES THEREOF

William H. Ryan, Billerica, and Vivian K. Walworth, Concord, Mass., assignors to Polaroid Corporation, Cambridge, Mass., a corporation of Delaware Application May 21, 1954, Serial No. 431,341

17 Claims. (Cl. 101—149.1)

This invention relates in general to practices useful for forming light polarizers of the character comprising a molecularly oriented plastic sheet which has a dichroic dye or dyes predeterminedly incorporated therein, as well as to procedures which facilitate the dyeing of such molecularly oriented plastic sheets with a dichroic dye or an isotropic dye, i.e., a dye which lacks dichroism. More particularly, the invention is concerned with methods for pretreating sheeting of this nature for enhancing the dyeing qualities thereof to the end of obtaining an improved dyed product and specifically is concerned with pretreatment procedure for molecularly oriented plastic sheet whereby to obtain improvements in the image qualities of dye images formed therein by the predetermined application of dichroic dyes as well as isotropic dyes to said sheet.

Objects of the invention reside in the pretreatment of a sheet of a transparent, orientable, linear, high molecular weight, hydroxyl-containing polymer which has the molecules thereof substantially oriented to the end of improving the dyeing qualities of said sheet, and particularly to a method carried out preparatory to applying an aqueous solution of a dye to the sheet and which comprises uniformly wetting said sheet with an aqueous solution containing iodide ions and ions of a bivalent metal selected from the class consisting of beryllium, magnesium and cadmium; to provide processes of this nature wherein excess pretreating solution is removed from the sheet after permeation of said iodide ions and ions of said bivalent metal into said sheet; and to provide processes which in general improve the receptivity of molecularly oriented sheets of polymers of the character set forth for dichroic dyes and also isotropic dyes and which also result in improving the pictorial quality of dye images formed therein by the predetermined dyeing of said sheet.

Other objects of the invention are concerned with the reproduction of light-polarizing dye images in a sheet of a transparent, orientable, linear, high molecular weight, hydroxyl-containing polymer which has the molecules thereof substantially oriented, by the transfer of dye from a relief matrix contacted with a surface of the sheet or by the successive transfer of different colored dyes by the successive application to said surface in registered contact therewith of two or more of such printing matrices, and is especially concerned with providing processes for improving the dyeing qualities of said sheet wherein the sheet, prior to the application of each printing matrix thereto, is wetted with an aqueous solution containing iodide ions and ions of a bivalent metal selected from the class consisting of magnesium and cadmium, following which excess pretreating solution with which the sheet is wetted is removed and the sheet, while still wet, is positioned for the pressure application thereto of one of said printing matrices; and as a further object, the invention is particularly concerned with improvements of processes of this nature for forming a light-polarizing dye image of a stereoscopic pair of images in each of a pair of sheets of a transparent, orientable, linear, high molecular weight, hydroxyl-containing polymer, particularly polyvinyl alcohol sheets, which are arranged in superposed relation to each other and which have their respective molecules substantially oriented and are positioned so that the orientation axis of one of said sheets is at 90° to the orientation axis of the other of said sheets.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

Figure 2:
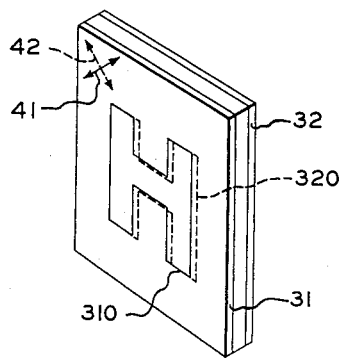

For a fuller understanding of the nature and objects of the invention, reference should be had to the following detailed description taken in connection with the accompanying drawing wherein:

Figure 1 is a diagrammatic illustration showing the manner of forming pairs of superposed, light-polarizing, stereoscopic, dye images in stereoscopic film stock by the application to each side of the film stock of a printing matrix which contains, as a relief image, one of a stereoscopic pair of images to be printed and which is wet with a dichroic dye; and Fig. 2 is a diagrammatic perspective view of a stereoscopic color print produced on the stereoscopic film stock by the procedure illustrated in Fig. 1.

One practice for producing a light polarizer is to adsorb a dichroic dye in a transparent, molecularly oriented, linear, high molecular weight, hydroxyl-containing polymer of which a preferred example is polyvinyl alcohol. Wherever a dichroic dye is adsorbed in a molecularly oriented plastic sheet of this nature, it renders the sheet light-polarizing. Thus, oriented plastic materials of the nature previously described are, in general, useful to provide dye polarizers and are particularly suited as a medium for providing stereoscopic, light-polarizing prints in color.

Plastic sheet, such as polyvinyl alcohol and the like, when in unoriented condition, is in general easily dyed by wetting the sheet with aqueous dye solution. However, molecular orientation makes it more difficult to penetrate the platsic sheet with dye solutions. Hence, a primary concern of the present invention is to provide treatment for sheets, strips or films of transparent, orientable, linear, high molecular weight, hydroxyl-containing polymers which is designed to improve the dyeing thereof, and especially to provide treatment which leads to the formation therein of dye images of enhanced quality by preconditioning said sheets, strips or films prior to and in preparation for the application of dye thereto.

With these aims and objects in mind, some explanation of the nature of stereoscopic print material and the manner of forming light-polarizing images therein by the predetermined application of dichroic dyes to the material will lead to a fuller understanding of the present invention.

In this regard, a suitable medium in which superposed, light-polarizing stereoscopic, left- and right-eye images may be formed is provided by the stereoscopic film stock 30 illustrated in Fig. 1 as comprising a laminar structure having two thin and transparent surface layers 31 and 32 mounted upon the opposite sides of a transparent support 33. The surface layers 31 and 32 are thin sheets of a transparent, molecularly oriented, high molecular weight, hydroxyl-containing polymer of which a preferred example is polyvinyl alcohol, while the support 33 is any suitable transparent and substantially water-impermeable plastic such as cellulose acetate butyrate or cellulose triacetate.

The layer 31 has its molecules so oriented that the transmission or polarizing axis of the layer will be at 45° to the edge of the film stock 30, while the layer 32 has its molecules so oriented that the transmission or polarizing axis of the layer will also be at 45° to the edge of the film stock but will make an angle of 90° with the transmission axis of the layer 31. A preferred orientation is indicated by the arrows 41 and 42 in Fig. 2, which schematically illustrates the stereoscopic film stock 30 after image formation therein and shows the front layer 31 with transmission axis 41 extending upwardly to the right for receiving the right-eye picture of a stereoscopic pair and the rear layer 32 with its transmission axis extending upwardly and to the left for receiving the left-eye stereoscopic picture.

Film structures of this general nature are disclosed in U.S. Patents Nos. 2,289,714, 2,289,715 and 2,315,373. The film stock 30 provides a transparent structure useful as motion picture film or cut film. Additionally, the film stock 30 may be mounted upon an opaque, nonpolarizing, reflecting base and used for the formation of light-polarizing reflection prints. Stereoscopic image pairs formed in the film stock 30 will be located in superposed relation to each other.

Image formation in the film stock 30 is carried out by printing with washoff relief matrices in each of which a solution of a suitable dichroic dye has been imbibed. The washoff relief matrices are prepared from photographic originals or duplicates thereof by conventional practices and, after imbibition of a solution of dichroic dye therein, are pressed into contact with the outer faces of the layers 31 and 32 to transfer portions of said solution to each of said layers.

Two sets of printing matrices, one for the right-eye image and one for the left-eye image, are used for the positive reproduction of a stereoscopic pair of images in suitable film stock such as the stock 30. For color positives, each set of matrices comprises two or more individual relief matrices which each bear a positive color separation record of one image of the stereoscopic pair of images to be reproduced. The individual matrices in a set used for color reproduction are printed successively on the stereoscopic film stock, for example the matrices representative of the cyan, magenta and yellow components of the color image to be reproduced may be applied to the film stock in the order just named.

A convenient means for simultaneously printing on opposite sides of the film stock 30 is schematically illustrated in Fig. 1 wherein the film stock 30 with a right-eye printing matrix and a left-eye printing matrix superposed on opposite sides thereof is shown as being passed between two rotating pressure-applying rolls 35 which cause the matrices to be pressed into intimate contact with the outer molecularly oriented layers 31 and 32 of the film stock.

A print or product resulting from the utilization of the procedure illustrated in connection with Fig. 1 is diagrammatically shown in Fig. 2 wherein film stock 30 is illustrated as containing a right-eye stereoscopic image 310 in the molecularly oriented layer 31 and a left-eye stereoscopic image 320 in the molecularly oriented layer 32. Image 310 is shown in full lines while image 320 is shown in dotted lines. For the purposes of simplification, the print shown in Fig. 2 has been considered as derived from a pair of stereoscopic records of the letter H and, in accordance with the process heretofore described, may be considered as providing a full color stereoscopic print.

Viewing is carried out by observing these light-polarizing images 310 and 320 through polarizing filters located in front of each eye of the observer with the transmission axes thereof positioned at 90% to each other. Additionally, the light-polarizing filters are so positioned with respect to the light-polarizing images in the film 30 that each has its respective polarizing axis crossed or at 90° to the polarizing axis of the image to be observed therethrough. In this way, each eye sees substantially only the image intended for it.

The molecular orientation of a plastic sheet is customarily carried out by stretching the sheet in the presence of heat. Stretching is conducted by the application to the sheet of opposed tensional forces. As it will be well understood, the result of such stretching is to cause orientation of the molecules of the sheet in a direction which is substantially parallel to the direction of application of the opposed stretching forces. The higher the degree of this stretching, the more complete will be the molecular orientation.

The effect of stretching on plastic sheeting may be determined empirically by printing a plurality of unit circles at intervals along a surface of the sheeting in its unstretched condition. When this sheeting is then stretched, it will be found that these circles have been converted into ellipses having major axes which extend in a direction generally parallel to the direction of application of the opposed stretching forces. The ratio of the major axis of such an ellipse to its minor axis is known as the axial ratio and is a measure of the degree of stretch imparted to the sheet. The higher this axial ratio, the higher the degree of stretch.

High axial ratios are desirable for the purpose of increasing the efficiency of the sheet polarizer. The efficiency of a sheet polarizer is determined by its density ratio, sometimes referred to as the dichroic ratio. In general, the higher the axial ratio, the higher the density ratio.

One effect of stretching a plastic sheet, such as polyvinyl alcohol, by practices such as those described, is to cause the sheet to develop a resistance to dissolution in aqueous solution at a given temperature. In general, this decrease in solubility of the plastic material in aqueous solution is a function of the degree of its molecular orientation, i.e., the greater the axial ratio, the greater the insolubility of the sheet. Such decrease in the solubility of the plastic material affects the ability of an aqueous solution to permeate a sheet of the same and as previously indicated affects the printing of the sheet, by dye transfer processes, of light-polarizing images. For example, it has been found that it is particularly difficult to form dye images of high density in highly oriented plastics, i.e., plastic sheeting having an axial ratio of 3 and higher without impairing image definition.

It is therefore desirable to subject the molecularly oriented sheet, at a time prior to the transfer printing of dye images therein, to preconditioning by imbibing into the sheet a solution containing a reagent or reagents which carry out a number of functions. Application of the pretreating solution is by contact with one surface of the sheet or by immersion of the sheet in the solution. This ideal pretreating or prewetting solution should swell the polyvinyl alcohol or other oriented layers of the film stock, increase the receptivity of these layers for dye whereby to increase the quantity of dye depositable or penetrable into a unit portion of the layer with consequent increase in attainable dye density, increase the speed or rate of the dye transfer, substantially reproduce the definition of the matrix image in the dye image printed in the layers, and equalize small point-to-point differences in the surfaces of the film stock or in different runs of the film stock of a nature that are impressed in the stock during the manufacture thereof.

One method heretofore employed for preparing stereoscopic film stock for the transfer printing of dye images therein has been carried out by treating the stock with aqueous solutions of various alkalies, for example sodium hydroxide, monoethanolamine and the like, as well as combinations thereof. While alkaline pretreatment is successful to obtain the transfer of dye in the quantity needed for providing the desired dye density of the printed image, it fails in providing a mechanism for reproducing definition of the matrix image. This failure may be ascribed to the tendency of alkaline reagents to cause lateral diffusion of the dye solution in the film stock.

In the case of hand-held prints, i.e., relatively large size prints which are hand held for viewing, there are no stringent requirements in regard to image definition or more specifically resolving power. For example, resolution of 15 lines per millimeter is satisfactory for prints of 8″ x 10″. Resolution of this and higher magnitude has been achieved by alkaline pretreatment of molecularly oriented polyvinyl alcohol. When, however, the print is relatively small, for example a 35 mm. print, and is to be projected, the image definition requirements are greatly increased. Thus, image resolution of at least 40 lines per millimeter is set as a minimum acceptable requirement for motion picture film. As previously noted, image definition of this last-mentioned character has been unattainable in molecularly oriented plastic sheets by the pretreatment thereof in alkaline solutions.

Additionally, alkaline pretreating solutions of the character described, because of their highly caustic nature, are dangerous to handle and consequently are considered as hazardous for use in continuous printing processes carried out on machines.

As pointed out in our copending application Serial No. 431,396, filed May 21, 1954 for "Processing of Molecularly Oriented Sheets of Transparent, Linear, High Molecular Weight, Hydroxyl-containing Polymers to Improve the Dyeing Qualities Thereof," substantially any water-soluble iodide, when employed in aqueous solution for pretreating molecularly oriented, hydroxyl-containing polymers of the character with which this invention is concerned, is effective as a means for obtaining desired dye density by transfer. However, most common iodide salts, although providing better reproduction of the matrix image definition than the heretofore mentioned alkalies, do not provide a transfer image having that definition which is considered adequate for motion pictures, i.e., a minimum resolution of 40 lines per millimeter.

By this invention, it has been discovered that aqueous solutions containing iodide ions and ions of a bivalent metal selected from the metals in class II of the periodic table and particularly beryllium, magnesium or cadmium provide pretreating solutions which closely approach the desired ideal in that not only do they render the molecularly oriented sheet more receptive to dye whereby to increase the dye density per unit portion and speed up the dye transfer rate but also in that such solutions promote the formation in the sheet of dye images of high definition, i.e., images having a resolution of 40 lines and greater per millimeter. Pretreatment of this nature may be provided by aqueous solutions of one or more ionizable salts which dissociate to provide iodide ions and ions of a bivalent metal of the class just mentioned.

Solutions containing iodide ions and ions of a bivalent metal of the character described are particularly suited for pretreatment purposes since they are noncaustic and usually approximate a neutral condition. However, beryllium and beryllium compounds are quite toxic and while the employment of beryllium salts falls within the scope of this invention, such materials are not as preferred as cadmium and magnesium salts which require little precautions in handling and use. For example, the use of cadmium iodide is well known in the fields of photography, process engraving and lithography. Other properties affording ideal pretreatment are possessed by aqueous solutions containing iodide ions and bivalent metal ions such as beryllium or magnesium or cadmium in that such solutions are able to effectively swell the plastic layers of the film stock and equalize the heretofore mentioned surface differences in the stock.

It is not clearly understood why pretreatment with an aqueous solution of iodide ions and bivalent metal ions, such as beryllium, magnesium or cadmium ions, causes an increase in the rate of dye transfer, increases the deposited dye densities and improves image definition. Seemingly, the iodide ion functions to assist in carrying out the transfer, including increasing the quantity of the character described due to a considerable number of factors. In this regard, the presence of metallic iodide or bivalent metal ions and iodide ions, even in small con-dye per unit portion deposited in the oriented sheet material, and the metallic ion functions to improve definition of the image formed by the differentially transferred dye.

Furthermore, it is difficult to name a preferred concentration for a metallic iodide pretreating solution of the centrations, is beneficial for the purposes desired. As a general formulation, it may be stated that the desired results, particularly with reference to obtaining high dye densities and resolution of 40 lines per millimeter, are attainable with a 1 to 5% aqueous solution of a metallic iodide such as magnesium iodide or cadmium iodide by immersion of molecularly oriented polyvinyl alcohol sheet in the solution of a period of one minute while holding the solution at a temperature of about 70° F., i.e., room temperature. Increase in the metallic iodide to provide a 10% solution while maintaining the treating time and temperature at one minute and 70° F., respectively, appears to give but little improvement in the quality of the image printed except for possibly speeding up the transfer rate and giving some slight increase in the dye density obtained although such increases are of a substantially negligible order.

Similar conditions in regard to the bivalent metal ion and the iodide ion concentrations prevail for pretreating solutions which employ several ionizable salts of which one salt is an iodide other than a bivalent metallic iodide and the second salt is one which contains the desired bivalent metal constituent.

Another factor affecting the concentration of the pretreating solution resides in its use in heated condition, i.e., where the temperature of the solution is elevated above room temperatures. As will be hereinafter shown, such procedure is desirable from the standpoint of improving image quality and speeding up the printing time. Where heated pretreating solutions are used, it is possible to employ lower concentration to obtain satisfactory results. Still another factor affecting concentration is agitation of the pretreating solution during immersion of the oriented sheet therein.

In further regard to the pretreating solution, it may be noted as well known that many salts, including those named herein, will, under appropriate conditions involving temperatures and concentrations, precipitate dye from an aqueous dye solution when the salt is added to the solution of the dye. This precipitation is known as a salting out effect and results in the replacement of the dye in the dye solution by the salt. Obviously, such a condition is to be avoided in dye transfer printing. A high salt content in the pretreated film stock favors this undesired salting out of dye from the dye solution in the printing matrix. It should also be recognized that other factors enter into salting out effects. For example, a high concentration of dye in the dye solution in the printing matrix favors salting out conditions for a given salt content of the pretreated film stock while carrying out the transfer printing at high temperatures is in general a deterrent to salting out effects.

In carrying out these practices, an aqueous solution of cadmium iodide or magnesium iodide may be formed by directly adding either one of these compounds to water. Alternatively, an aqueous solution possessing the desired metallic and iodide ions is provided by the use of several water-soluble salts of which at least one salt is an iodide and of which at least one salt possesses the desired metallic constituent. For example, suitable pretreatment solutions may be made by the utilization of cadmium iodide or magnesium iodide and sodium iodide, or by the employment of an aqueous solution containing beryllium nitrate and sodium iodide or of a solution containing magnesium chloride and sodium iodide. In these last-mentioned solutions, the nitrate ion, the sodium ion and the chloride ion apparently exert considerably less effect on the overall quality of the transfer image than the heretofore mentioned bivalent metal ions.

Specific examples of suitable pretreating solutions of the previously described character are as follows:

Example I

| | | |
|---|---|---|
| Magnesium iodide | g | 100 |
| Water to make | ml | 1000 |

Example II

| | | |
|---|---|---|
| Cadmium iodide | g | 50 |
| Water to make | ml | 1000 |

Example III

| | | |
|---|---|---|
| Cadmium iodide | g | 10 |
| Sodium iodide | g | 40 |
| Water to make | ml | 1000 |

Example IV

| | | |
|---|---|---|
| Beryllium nitrate | g | 50 |
| Sodium iodide | g | 100 |
| Water to make | ml | 1000 |

Successful prewetting or preconditioning treatment for molecularly oriented plastic sheet of the character described has been carried out by the immersion of the sheet for one minute in any one of the solutions of Examples I through IV while holding the solution at a temperature of approximately 70° F. Treatment of this character has led to the production of highly acceptable individual color component light-polarizing images with cyan, magenta and yellow dyes as well as a three-color print formed by successively printing in register and from relief matrices each component image on a sheet of molecularly oriented plastic.

While preconditioning of molecularly oriented sheet material has been described as including the immersion of the sheet into the pretreating solution, it will be appreciated that pretreatment may be carried out by any practice wherein the pretreating solution is kept in contact with a surface of the sheet for a time necessary to successfully carry out the desired preconditioning.

In general, it is preferable to carry out the preconditioning of molecularly oriented sheeting with solutions at temperatures of above normal room temperature. Not only does the use of elevated temperatures speed up pretreatment time but it also speeds up the time required for dye transfer and additionally results in the formation of better images. The higher the temperature of an aqueous pretreating solution, the more tendency of the solution to dissolve the plastic material to which it is applied and consequently to destroy the molecular orientation thereof. On the other hand, the more highly oriented the sheet, i.e., the higher its axial ratio, the less likelihood of its dissolution by the hot pretreating solution. Molecularly oriented hydroxyl-containing polymers, particularly polyvinyl alcohol, having an axial ratio of 6, have been subjected for one minute to aqueous pretreating solutions at about 120° F. to 125° F. without harm to the sheet. Pretreatment solutions may be employed at higher temperatures if suitable compensations are made to care for this increase. Compensation measures include shortening the time of the application of the pretreating solutions; utilizing in the sheet a precipitant for the plastic material of the sheet, as for example sodium sulfate in the case of polyvinyl alcohol sheet; utilizing molecularly oriented sheet of higher axial ratio; or by utilizing other appropriate measures as a means for compensation and including any combination of the specific expedients just named.

After prewet treatment, excess liquid on the surface of pretreated film stock is removed by suitable means such as by an air blast, by passing the film stock through a pair of wringer rolls or merely by suspending the film stock and permitting the excess liquid to drain therefrom. The film stock, while still wet, but with excess liquid removed therefrom, is then suitably positioned for printing thereon with a printing matrix which contains an aqueous solution of a desired dye and which is pressed into contact with the surface of the film stock whereby to form the desired image in the film stock by the transfer of dye from the printing matrix.

The film stock is wetted with the pretreating solution before each printing of a subsequent component image or image pair which is printed in the film stock after the formation therein of the first component image or image pair. Such practice assures the presence in the film stock at each printing thereof of that quantity of pretreating solution needed for the formation of an image possessing the desired dye density and definition. Additionally, this successive wetting of the film stock with the pretreating solution allows each printing matrix to be applied onto a wet surface to the end of maintaining overall contact between the surface being printed and the printing surfaces of the applied matrix whereby to reduce the formation of air bubbles therebetween as well as to avoid other undesirable conditions which tend to retard or prevent successful dye transfer and dye image formation.

In general, direct cotton dyes of an essentially elongated structure may be named as suitable for forming light-polarizing images in molecularly oriented plastic materials, and especially molecularly oriented polyvinyl alcohol. Dyes of this nature are set forth in the previously mentioned patents and, as specific examples thereof, mention may be made of Niagara Sky Blue 6B (C.I. 518) and Niagara Sky Blue (C.I. 520) for cyan; Solantine Red 8BL (C.I. 278), Solantine Pink 4BL (C.I. 353) for magenta; and Solantine Yellow 4GL (Prototype 53) and Stilbene Yellow 3GA (C.I. 622) for yellow.

While the invention has been illustrated in connection with the formation of a multicolor image, it is to be noted that the practices set forth herein are useful in providing black-and-white images by the employment of a black dye or mixtures of dyes which together provide black.

While the invention has been described in connection with the pretreatment of molecularly oriented plastic materials to improve the quality of light-polarizing dichroic dye images formed therein, it will be appreciated that the invention is useful for the formation, in molecularly oriented material, of nonpolarizing images by the employment of isotropic dyes. For example, an isotropic dye or dyes are useful for providing one or more sound tracks in light-polarizing stereoscopic motion picture film.

Additionally, the practice as set forth herein may be extended for the improvement in production of sheet polarizers wherein the dichroic material is provided by a dichroic dye or mixture of dyes and is uniformly distributed throughout a molecularly oriented sheet of plastic, such as polyvinyl alcohol, which provides a light-polarizing element. The advantage of a pretreatment in this instance is primarily directed to an increase in the attainable dye density of the dye which is adsorbed in the oriented sheet material.

Throughout the specification and claims, reference has been made to orientable, linear, high molecular weight, hydroxyl-containing polymers and specifically to polyvinyl alcohol. Such reference will be understood to include polymers which have not been completely hydrolyzed, as for example partially hydrolyzed polyvinyl acetate, and is further intended to embrace polymers which may or may not have been subjected to stabilization by treatment with boric acid or other cross-linking agent, provided the polymeric material exhibits essentially the properties recognized by those skilled in the art as characteristic of commercially available polyvinyl alcohol.

Since certain changes may be made in the above process without departing from the scope of the invention herein involved, it is intended that all matter contained in the above description or shown in the accompanying drawing shall be interpreted as illustrative and not in a limiting sense.

What is claimed is:

1. In a method of dyeing a sheet of a transparent, orientable, high molecular weight, hydroxyl-containing, vinyl polymer which has the molecules thereof oriented in a predetermined direction, the steps comprising first imbibing into said sheet throughout at least a surface thereof an aqueous pretreating solution containing iodide ions and ions of a bivalent metal selected from the class consisting of beryllium, magnesium and cadmium so that a uniform distribution of said ions exists and said sheet is caused to be predeterminedly swelled for improved reception of a dichroic direct cotton dye, and then imbibing into at least one surface of said sheet an aqueous solution of said dye of a predetermined color to predeterminedly dye said sheet.

2. A method as defined in claim 1 of dyeing a sheet of a molecularly oriented polymer, wherein said pretreating solution comprises cadmium iodide.

3. A method as defined in claim 1 of dyeing a sheet of a molecularly oriented polymer, wherein said pretreating solution comprises magnesium iodide.

4. A method as defined in claim 1 of dyeing a sheet of a molecularly oriented polymer, wherein said pretreating solution comprises sodium iodide and also a salt of a bivalent metal selected from the class consisting of beryllium, magnesium and cadmium.

5. A method as defined in claim 1 of dyeing a sheet of a molecularly oriented polymer, wherein said sheet comprises polyvinyl alcohol.

6. In a method of forming both an anisotropic light-polarizing dye image and an isotropic dye image in a sheet of a transparent, high molecular weight, hydroxyl-containing, vinyl polymer having the molecules thereof oriented in a given direction, the steps comprising pretreating said sheet prior to the transfer of either of said dye images thereto by imbibing into said sheet substantially throughout a surface thereof an aqueous solution containing iodide ions and ions of a bivalent metal selected from the class consisting of beryllium, magnesium and cadmium so that a substantially uniform distribution of said ions exists throughout the area of said sheet, removing excess pretreating solution from said surface, transferring from suitable printing means to a given portion of said surface an imagewise distribution of at least one aqueous dye solution comprising a dichloric direct cotton dye of a given color, and transferring from suitable printing means to another given portion of said surface an imagewise distribution of an aqueous dye solution comprising a nondichroic dye.

7. In a method of forming with a direct cotton dye a dichroic, light-polarizing image in a sheet material comprising at least a layer of a transparent, high molecular weight, hydroxyl-containing, vinyl polymer having the molecules thereof oriented in a given direction, the steps comprising pretreating said layer prior to transferring said dye image thereto to improve the receptivity of the sheet to said dye image and to improve image definition by imbibing into said layer substantially throughout its area an aqueous solution containing iodide ions and ions of a bivalent metal selected from the class consisting of beryllium, magnesium and cadmium so that a substantially uniform distribution of said ions is provided throughout the area of said layer, removing excess pretreating solution from the surface of said layer, and transferring from a printing matrix to said layer an imagewise distribution of at least one aqueous dye solution, said solution comprising a dichroic direct cotton dye of a given color.

8. A method of forming a direct cotton dye, light-polarizing image as defined in claim 7, wherein said pretreating solution comprises cadmium iodide.

9. A method of forming a direct cotton dye, light-polarizing image as defined in claim 7, wherein said pretreating solution comprises magnesium iodide.

10. A method of forming a direct cotton dye, light-polarizing dye image as defined in claim 7, wherein said pretreating sloution comprises sodium iodide and also a salt of a bivalent metal selected from the class consisting of beryllium, magnesium and cadmium.

11. A method of forming a direct cotton dye, light-polarizing image as defined in claim 7, wherein said layer comprises polyvinyl alcohol.

12. In a method of forming a multicolor light-polarizing image which employs a set of printing matrices and a plurality of dichroic direct cotton dyes for forming a plurality of light-polarizing dye images in a sheet material comprising at least a layer of a transparent, high molecular weight, hydroxyl-containing, vinyl polymer having the molecules thereof oriented in a given direction, the steps comprising pretreating said layer prior to transferring each of said dye images thereto by imbibing into said layer substantially throughout its area an aqueous solution containing iodide ions and ions of a bivalent metal selected from the class consisting of beryllium, magnesium and cadmium so that a substantially uniform distribution of said ions exists throughout the area of said layer, partially drying any excess of the pretreating solution on the surface of said layer before forming each dye image thereon, and transferring in succession and in proper registration from each matrix of said set to said layer an imagewise distribution of an aqueous solution of each of said dichroic direct cotton dyes to form said multicolor light-polarizing image.

13. In a method of forming a pair of multicolor, stereoscopic, light-polarizing images which employs two stereoscopic sets of printing matrices and a plurality of dichroic direct cotton dyes for forming a plurality of light-polarizing dye images in a sheet material comprising two layers of a transparent, high molecular weight, hydroxyl-containing, vinyl polymer, each layer having the molecules thereof oriented substantially at 90° to those of the other, the steps comprising pretreating each of said layers prior to transferring each of said plurality of dye images thereto by imbibing into said layers substantially throughout their areas an aqueous solution containing iodide ions and ions of a bivalent metal selected from the class consisting of beryllium, magnesium and cadmium so that a substantially uniform distribution of said ions exists throughout the areas of said layers, partially drying the pretreating solution on the surface of each said layer before transferring a dye image thereto, transferring in succession and in proper registration from the matrices of one of said two sets to one of said layers an imagewise distribution of an aqueous solution of each of said dichroic direct cotton dyes representing one of said pair of stereoscopic images, and transferring in succession and in proper registration from the matrices of the other of said two sets to the other of said layers an imagewise distribution of an aqueous solution of each of said dichroic direct cotton dyes representing the other of said pair of stereoscopic images.

14. A method of forming stereoscopic, light-polarizing, multicolor images as defined in claim 13, wherein said pretreating solution comprises cadmium iodide.

15. A method of forming stereoscopic, light-polarizing, multicolor images as defined in claim 13, wherein said pretreating solution comprises magnesium iodide.

16. A method of forming stereoscopic, light-polarizing, multicolor images as defined in claim 13, wherein said pretreating solution comprises sodium iodide and a salt of a bivalent metal selected from the class consisting of beryllium, magnesium and cadmium.

17. A method of forming stereoscopic, light-polarizing, multicolor images as defined in claim 13, wherein each of said layers of the sheet material comprises polyvinyl alcohol.

References Cited in the file of this patent

UNITED STATES PATENTS

| Number | Name | Date |
|---|---|---|
| 2,070,222 | Brewster | Feb. 9, 1937 |
| 2,315,373 | Land | Mar. 30, 1943 |
| 2,328,219 | Land | Aug. 31, 1943 |
| 2,373,035 | Land | Apr. 3, 1945 |
| 2,387,914 | Kienninger | Oct. 30, 1945 |
| 2,635,535 | Jennings | Apr. 21, 1953 |

UNITED STATES PATENT OFFICE
CERTIFICATE OF CORRECTION

Patent No. 2,931,295                                    April 5, 1960

William H. Ryan et al.

It is hereby certified that error appears in the above numbered patent requiring correction and that the said Letters Patent should read as corrected below.

Column 2, line 45, for "platsic" read -- plastic --; column 3, line 72, for "90%" read -- 90° --; column 6, lines 5, 6 and 7, strike out "character described due to a considerable number of factors. In this regard, the presence of metallic iodide or bivalent metal ions and iodide ions, even in small con-" and insert the same after "of the" in line 12, same column 6; same column 6, line 20, for "of", first occurrence, read -- for --; column 10, line 8, for "sloution" read -- solution --.

Signed and sealed this 4th day of August 1964.

(SEAL)
Attest:

ERNEST W. SWIDER                               EDWARD J. BRENNER
Attesting Officer                                    Commissioner of Patents